June 2, 1964
G. B. BIELINSKI ETAL
3,135,630
SOLDER FLUX GENERATOR
Filed June 29, 1961
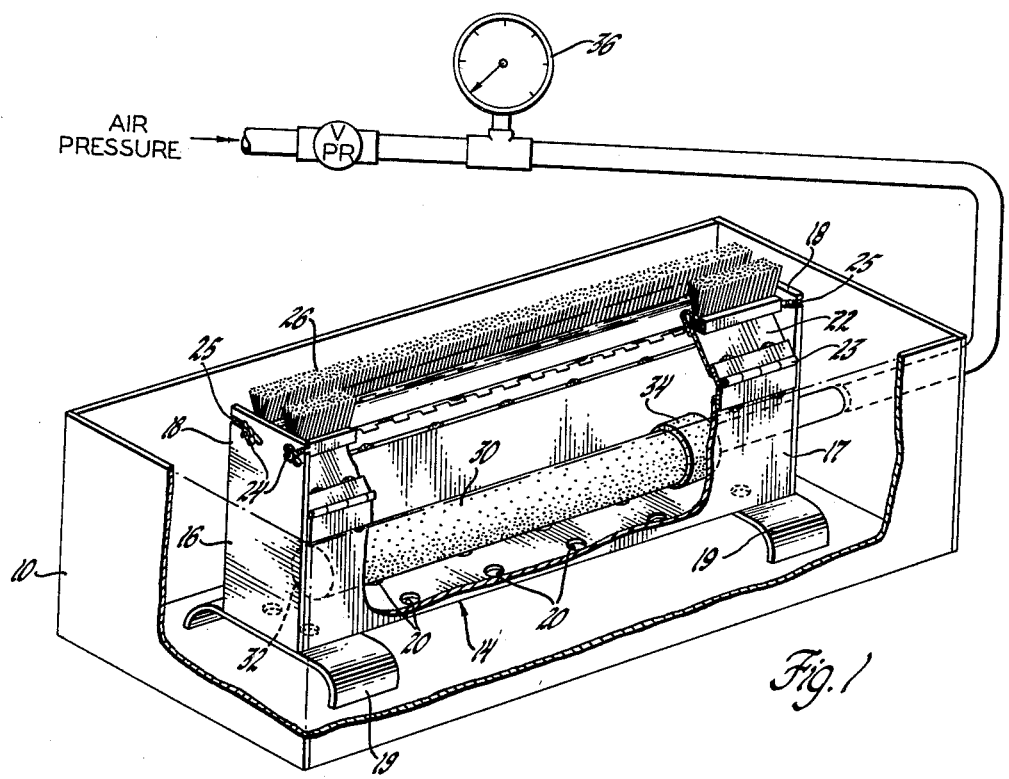
Fig. 1
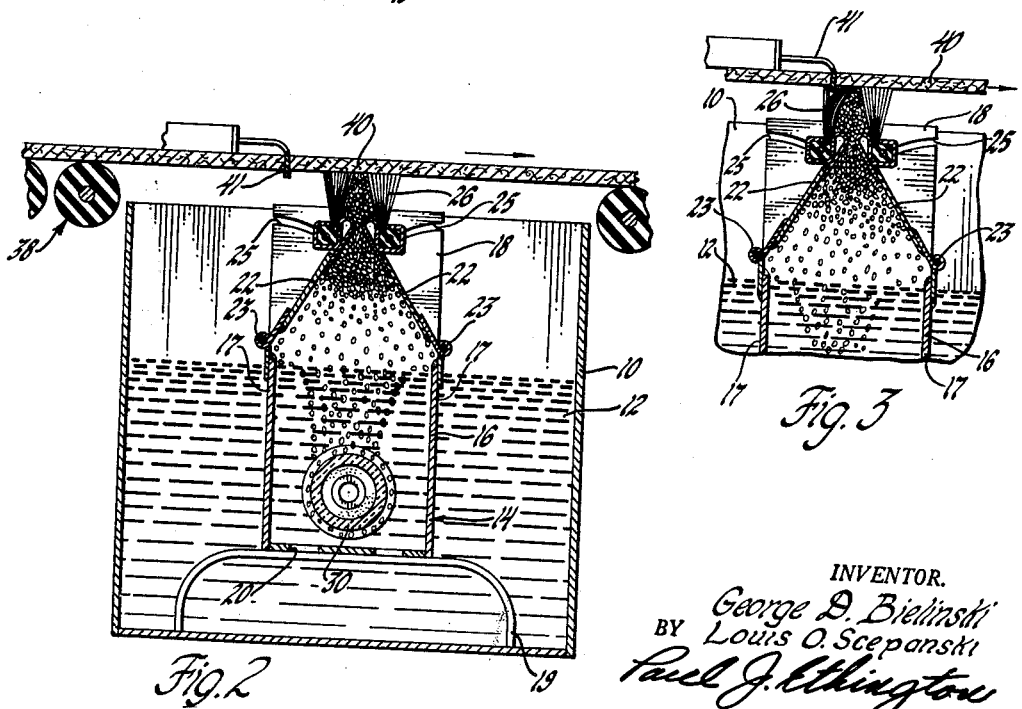
Fig. 2
Fig. 3
INVENTOR.
George B. Bielinski
BY Louis O. Scepanski
Paul J. Ethington
ATTORNEY

United States Patent Office 3,135,630
Patented June 2, 1964

3,135,630
SOLDER FLUX GENERATOR
George D. Bielinski and Louis O. Scepanski, Milwaukee, Wis., assignors to General Motors Corporation, Detroit, Mich., a corporation of Delaware
Filed June 29, 1961, Ser. No. 120,717
2 Claims. (Cl. 118—410)

This invention relates to a means and method for producing foam, and more particularly to a means and method for coating an article with a liquid.

In the art of assembling electrical components to printed circuit boards, it is common practice to insert the component leads through apertures in the circuit boards so that the terminal portions of the leads will be on the same side of the board and will be adjacent the portions of the printed circuit conductor to which solder connections are to be made. Then a solder flux composition is applied to the terminals on the one side of the board and the soldered connections will be made by dip-soldering or otherwise applying molten solder to the parts to be soldered. Usually the solder flux composition is a solution of rosin in alcohol. There are several common methods of applying the flux to the circuit board, each of which has serious disadvantages. The use of a roller to apply the flux to the board results in an uneven distribution of flux so that critical areas may not receive any flux. The flux may be applied by brushing, or by dipping the circuit board into the surface of a pool of flux. However, these methods will apply an excessive amount of flux to the board. This causes two main difficulties. First, when the board with excess flux is presented to a pool or wave of molten solder as in the solder dipping operation, the alcohol in the flux will burn thereby creating a fire hazard, and a similar hazard is created when the flux coated board is dried in an oven prior to soldering. Secondly, the remaining rosin will become burned onto the board during soldering so that subsequent removal of the flux is made exteremly difficult. Flux may be applied to the circuit board by spraying. However, spraying obviously creates a fire hazard due to the excessive evaporation of alcohol from the flux composition.

Objects of this invention are to provide means for avoiding the above mentioned difficulties by applying a flux foam to a printed circuit board, to provide a method of producing a flux foam for application to a printed circuit board, to provide means for generating a foam from a liquid, and to provide a method of applying a liquid coating to an article.

The invention is carried out by providing means to distribute air under pressure in sufficiently fine streams and to pass the air streams through a liquid to produce foam. Another aspect of the invention is carried out by converting a liquid to foam and applying the foam to an article thereby forming a liquid coating on said article.

The above and other advantages of the invention will be made more apparent from the following specification taken in conjunction with the accompanying drawings wherein like numerals refer to like parts, and wherein:

FIGURE 1 is an illustration of a flux foam generator according to the invention;

FIGURE 2 is an illustration of the foam generator applying a flux foam to a printed circuit board; and FIGURE 3 is another illustration of the foam generator applying flux foam to a printed circuit board.

Referring now to FIGURES 1 and 2 of the drawings, a reservoir 10 having a liquid 12 has situated therein a foam generator 14. The generator 14 comprises a box-like tank 16 having elongate sides 17 and ends 18. The tank 16 is spaced from the bottom of the reservoir 10 by legs 19. Apertures 20 in the bottom of the tank 16 admit the liquid 12 to the interior of the tank 16 so that the liquid 12 seeks the same level in the tank 16 as in the reservoir 10. The top of the tank 16 is open and preferably has a pair of panels 22 each of which is hinged to the top of the tank sides by a piano hinge 23. Each panel 22 is adjustably positioned by a wing nut and bolt arrangement 24 secured thereto and extending through an arcuate slot 25 in the tank end 18. A long brush 26 coextensive with the length of the panels 22 is secured by any convenient means to the top of each panel 22 so that the bristles of the brush extend vertically upward. Nylon brushes are found to be suitable for this purpose. The ends 18 of the tank 16 extend upwardly beyond the hinged panels 22 but terminate below the tops of the brushes 26.

The purpose of providing the hinged panels 22 rather than stationary panels is twofold. First of all, by varying the spacing between the brushes 26, it is possible to vary the height of the foam head, as may be desirable for any particular operation. Secondly, the accessibility to the interior of the tank 16 is improved thereby making assembly and repairs very convenient.

An elongated hollow cylindrical air distributing means 30 extends longitudinally of the tank 16 near the bottom thereof so as to be completely submerged in the liquid 12. The cylindrical distributing means 30 is closed at one end 32 and has a nipple 34 secured to the other end for admitting air to the interior thereof. Nipple 34 extends through one end of the tank 16 and is connected to a source of air pressure through a conventional pressure control valve 36. The distributing means 30 has porous walls to permit air from the pressure source to seep into the liquid 12 in very fine streams so as to bubble through the liquid and thereby produce a foam on the liquid. The foam will, of course, form a head above the surface of the liquid 12 and will emerge from the top of the tank between the brushes 26.

In practice it has been found that a suitable distributing means 30 is known commercially as a Sealas filter candle. This filter candle is a hollow cylindrical porous device as is illustrated in the drawings and described above. The candle is composed of a fired ceramic and is obtainable in grades of very fine porosity. For the most satisfactory generation of foam, it has been found that the very fine porosity candle is desirable and requires only two to five pounds per square inch of air pressure to supply adequate foam for usual circuit board assembly line applications. Any commercial liquid solder flux has been found to be satisfactory for the generation of foam in the apparatus of this invention.

FIGURES 2 and 3 illustrate the application of the invention to a circuit board assembly line. A conveyor 38 carries circuit boards 40 over the foam generator 14 so that the underside of the boards 40 to which the flux is to be applied contacts the top of the brushes 26. The flexibility of the brushes 26 permits component leads 41 to pass through undisturbed, as shown in FIGURE 3. The circuit board 40 contacts the foam head sufficiently to acquire a distribution of flux over the surface thereof. Since there is very little liquid material in the foam head, the amount of flux applied to the board 40 is not excessive, yet it is entirely adequate. As the flux board 40 passes beyond the foam head, the second brush 26 insures that the distribution of flux on the board is uniform and serves to wipe off any excess flux if, by some means, an excessive amount has accumulated.

Thus this invention provides means of applying a minimal coating of flux to the circuit boards 40 without missing any portions of the board surface. This has the advantage of not only eliminating the waste of flux material, but also minimizes the possibility of any fire hazard in subsequent drying or soldering operations on the board, and further, makes the removal of flux from the circuit board after the soldering operation relatively easy.

Although the invention is described in terms of a means and method of applying a flux to a circuit board it is readily seen that the teachings of the invention may be applied to any liquid coating operation. It is understood that the invention is not limited to the specific embodiment described above, and the scope of the invention is intended to be limited only by the following claims.

I claim:

1. A soldering flux foam generator comprising a liquid reservoir, a container within said reservoir, apertures in said container to admit liquid soldering flux thereto, a porous ceramic hollow cylinder in said container submerged in said liquid, means to force air through the walls of said cylinder to thereby produce flux foam in said liquid, an opening in said container above the liquid level to provide an exit for said flux foam, means for adjusting the height of the flux foam above the surface of the liquid comprising a pair of adjustable panels hingedly secured to said container on opposite sides of the opening thereof, and brush means along the edges of said panels for applying said foam to a part to be soldered.

2. A soldering flux foam producing means comprising a source of air pressure, distributing means connected with said source for dividing incoming air into fine streams, a container for liquid soldering flux, said distributing means being submerged in a pool of liquid soldering flux disposed within said container whereby air will bubble through said liquid to generate a flux foam, means associated with said container for adjusting the height of the flux foam above the pool of liquid soldering flux, and means for applying said foam to a part to be soldered.

References Cited in the file of this patent

UNITED STATES PATENTS

| | | |
|---|---|---|
| 1,124,855 | Callow et al. | Jan. 12, 1915 |
| 1,458,612 | Berkshire | June 12, 1923 |
| 1,968,687 | Johnson | July 31, 1934 |
| 2,106,982 | Kepfer | Feb. 1, 1938 |
| 2,960,710 | McKeegan | Nov. 22, 1960 |
| 3,047,418 | Compton | July 31, 1962 |

FOREIGN PATENTS

| | | |
|---|---|---|
| 567,834 | Canada | Dec. 23, 1958 |